(12) United States Patent
Saxena et al.

(10) Patent No.: US 12,541,104 B2
(45) Date of Patent: Feb. 3, 2026

(54) DISPLAY DEVICE AND METHOD

(71) Applicant: Envisics Ltd, Milton Keynes (GB)

(72) Inventors: Antariksh Saxena, Milton Keynes (GB); Ian Bledowski, Milton Keynes (GB); Rory Cooney, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 287 days.

(21) Appl. No.: 18/475,433

(22) Filed: Sep. 27, 2023

(65) Prior Publication Data

US 2024/0126078 A1 Apr. 18, 2024

(30) Foreign Application Priority Data

Oct. 13, 2022 (GB) .................................... 2215076

(51) Int. Cl.
  *G02B 27/01* (2006.01)
(52) U.S. Cl.
  CPC ..... *G02B 27/0103* (2013.01); *G02B 27/0149* (2013.01)
(58) Field of Classification Search
  CPC ............ G02B 27/0103; G02B 27/0149; G02B 26/08; G02B 27/18; G02F 1/13398
  See application file for complete search history.

(56) References Cited

U.S. PATENT DOCUMENTS

2020/0150590 A1\* 5/2020 Christmas ............ G03H 1/0005

FOREIGN PATENT DOCUMENTS

| JP | 2016194655 A | 11/2016 |
|----|--------------|---------|
| JP | 2017207588 A | 11/2017 |
| KR | 20070031548 A | 3/2007 |

OTHER PUBLICATIONS

Combined Search and Examination Report issued on Apr. 13, 2023 in UK Application GB 2215076.7 (5 pages).

\* cited by examiner

*Primary Examiner* — James C. Jones
(74) *Attorney, Agent, or Firm* — Akerman LLP

(57) ABSTRACT

There is provided a display device comprising a substrate; a spatial light modulator and a sealing element. The spatial light modulator is mounted on the substrate and comprises a light modulating region and an electrical connection region adjacent to the light modulating region. The sealing element comprises a primary portion comprising a first material and a secondary portion comprising a second material. The primary portion of the sealing element extends around at least a portion of a perimeter of the light modulating region and the secondary portion of the sealing element extends over the electrical connection region. The first material has a first coefficient of thermal expansion that is greater than a second coefficient of thermal expansion of the second material.

25 Claims, 7 Drawing Sheets

DISPLAY DEVICE AND METHOD

CROSS-REFERENCE TO RELATED APPLICATIONS

This application claims priority under 35 U.S.C. § 119 to UK Patent Application GB 2215076.7 titled "Display Device and Method," filed on Oct. 13, 2022, and currently pending. The entire contents of GB 2215076.7 are incorporated by reference herein for all purposes.

FIELD

The present disclosure relates to a display device and a method of encapsulating a spatial light modulator of a display device. More specifically, the present disclosure relates to a display device comprising a spatial light modulator mounted on a substrate. Some embodiments relate to a holographic display system comprising the display device and a method of displaying a hologram of a picture. Some embodiments relate to a head-up display (HUD).

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and light detection and ranging, "LiDAR", for example.

SUMMARY

Aspects of the present disclosure are defined in the appended independent claims.

In general terms, a display device and a method of encapsulating a spatial light modulator of a display device are provided in which a spatial light modulator (such as a liquid crystal on silicon spatial light modulator) is mounted on a substrate and comprises an electrical connection region. The spatial light modulator is encapsulated by a sealing element arranged to prevent the ingress of moisture to the spatial light modulator. The sealing element comprises first and second portions comprising first and second materials that are selected to maintain the sealing effect even when the display device is exposed to a wide range of temperatures and to thermal shocks. Furthermore, the sealing element does this without adversely affecting the performance of the spatial light modulator and/or damaging the electrical connection region.

A display device according to the disclosure may be suitable for use in a picture generating unit or projector, such as a holographic projector. For example, the display device may be used in a system—such as a head-up display (HUD)—which is configured to display a picture to a viewer, without requiring the user to look away from their usual, or required, viewpoint. The display device may be particularly suitable for an HUD system comprised within a vehicle.

In the context of a picture generating unit or projector, the spatial light modulator must accurately modulate incident light according to a target image or hologram if the spatially modulated light is to correctly be encoded with that image or hologram. Spatial light modulators, such as liquid crystal on silicon spatial light modulators, are very sensitive electrical components and may be adversely affected by moisture and/or may be adversely affected be mechanical stress or strain. When a spatial light modulator is used in a relatively controlled environment having low humidity and stable temperature, ingress of moisture into the spatial light modulator may not be a concern. However, there is a need to use spatial light modulators in humid environments with an unstable or varying temperature. A particular example of such an environment is the inside of a vehicle or automobile.

Components to be used in vehicles must be able to perform acceptably over a wide range of temperatures and over a range of different humidities. For example, an electrical component located within the dashboard of a vehicle that is exposed to direct sunlight may be required to perform acceptably across a temperature ranging from as low as minus 40 degrees Celsius or lower to as high as 90 degrees Celsius or higher. An electrical component for use in a vehicle may be required to perform acceptably in a humidity ranging from 60% or less to 90% or more. The automotive industry typically apply strict testing methods to any electronic components to certify that the component is suitable before it can be used in a vehicle. These tests include thermal shock tests in which the display device is quickly transferred between two extreme temperatures. The thermal shock test may be repeated for 1000 cycles or more. The tests may comprise testing the electrical component after being exposed to a high humidity environment for 500 hours or more. These tests are far more rigorous than tests typically applied to electrical components not for use in the automotive industry. Furthermore, it is not enough for an assembled device to pass automotive standard tests. Typically, each individual electrical component is tested separately before being certified as being acceptable for us in a vehicle. So, in order for a HUD system to be suitable for use in a vehicle, the display device of that HUD system must perform acceptably in the unstable humid and unstable temperature environment of a vehicle and must be able to pass the automotive testing requirements.

It is known to encapsulate electronic components with a rigid material having a low coefficient of thermal expansion. However, the inventors have found that known encapsulation arrangements are not suitable for spatial light modulators, in particular for spatial light modulators that are suitable for use in the automotive industry and which comply with the rigorous testing of the automotive industry. The inventors have found that conventional approaches to encapsulation causes mechanical stress and strain on the spatial light modulator which is not acceptable for holography because of the reliance on complex optical interactions such as diffraction and interference. The inventors found that this was a particular problem during the rigorous thermal shock tests that are necessary for automotive applications. Whilst these issues may be tolerable for conventional electrical components or even conventional (non-holographic) display devices, the problem is significantly worse when a display device used to display a hologram is encapsulated. This is because very small changes to the hologram/diffractive structure cause very significant changes to the image. Furthermore, it has been found that a conventional approach to encapsulation did not adequately prevent the ingress of moisture during rigorous automotive testing.

The display device according to the disclosure addresses the above problems. The sealing element according to the disclosure has been found to prevent the ingress of moisture into the spatial light modulator without applying a significant mechanical stress or strain to the spatial light modulator across a range of temperatures that is suitable for the automotive industry, and even during a thermal shock test. In particular, the sealing element according to this disclosure enables the device to be used for holography in a real-world environment. Furthermore, the sealing element according to the disclosure protects (and does not damage) delicate electrical connections of the display device.

According to a first aspect of the disclosure there is provided a display device. The display device comprises a substrate and a spatial light modulator. The spatial light modulator is mounted on the substrate. The spatial light modulator comprises a light modulating region and an electrical connection region adjacent to the light modulating region. The display device further comprises a sealing element. The sealing element comprises a primary portion comprising a first material. The sealing element further comprises a secondary portion comprising a second material. The second material is different to the first material.

The primary portion of the sealing element extends around at least a portion of a perimeter of the light modulating region. The secondary portion of the sealing element extends over the electrical connection region. The first material (of the primary portion) has a first coefficient of thermal expansion that is greater than a second coefficient of thermal expansion of the second material (of the secondary portion).

The spatial light modulator may be described as being encapsulated by the sealing element. The skilled person will be familiar with electronic encapsulation of electrical components.

As used herein, the "sealing element" means an element that is arranged to encapsulate the spatial light modulator and provide a seal around the spatial light modulator to protect the spatial light modulator from the atmosphere, in particular to prevent the ingress of moisture from outside of the spatial modulator. The seal may be a hermetic seal.

While the sealing element may extend around a perimeter of the light modulating region of the spatial light modulator, the light modulating region may not be covered by the sealing element. In this way, the light modulating region of the spatial light modulator is able to receive incident light and/or emit spatially modulated light. Typically, the light modulating region of a spatial light modulator comprises a transparent cover, such as a glass cover. The transparent cover may prevent moisture ingress into the spatial light modulator via a planar top surface of the light modulating region. Moisture ingress may also be prevented at the region of the spatial light modulator mounted on the substrate which is typically a planar bottom surface. So, providing a sealing element around at least a portion of the perimeter of the light modulating region (preferably extending between the substrate and the transparent cover) may seal that portion of the light modulating region. The primary and secondary portions of the sealing element may combine to encapsulate the entire perimeter of the light modulating region and the electrical connection region.

As discussed above, it is known to encapsulate electronic components with a rigid material having a low coefficient of thermal expansion. The rigidity of such materials means that mechanical stress or strain may be applied to electrical component. In most applications, this does not matter. However, the inventors have found that known encapsulation arrangements are not suitable for spatial light modulators, in particular when used in humid environments with unstable temperatures such as in vehicles because very small changes to the hologram/diffractive structure cause very significant changes to the image. Known encapsulation arrangements also may not be suitable for passing automotive standard tests.

The inventors have found that a hybrid configuration of the sealing element which comprises a primary portion and a secondary portion (according to the disclosure) can address some of the problems that exist when spatial light modulators are used in the real world for phase holography and/or in an automotive environment. In particular, the inventors have surprisingly found by simulation and experimentation that the increased manufacturing complexities associated with using two different materials for the encapsulation (rather than one material having a low coefficient of thermal expansion), are outweighed by the advantages of having different sealing materials around different parts of the active area. In particular, the primary and secondary portions of the sealing element combine to provide a hermetic seal around the spatial light modulator and which complies with rigorous automotive testing.

The hybrid arrangement devised by the inventors comprises a first material having a relatively high coefficient of thermal expansion that is applied to a primary portion (e.g. majority) of the sealing element. It is found that such materials are typically softer and/or more flexible or deformable than materials having a relatively low coefficient of thermal expansion. Similarly, the glass temperature of the first material may be relatively low (lower than the maximum temperature of the spatial light modulator during testing). Above the glass temperature, the first material may be even softer and even more flexible. The inventors found that by having a primary portion of the sealing element extending around at least a portion of the perimeter of the light modulating region (and which may be in contact with the spatial light modulator) and comprising the first material, mechanical stresses and strains on the critical light modulating elements (e.g. liquid crystal cells) are low over a large range of temperatures. The sensitive hologram/diffractive pattern is not therefore significantly distorted. In fact, it was found by experiment that the performance of the spatial light modulator may not be adversely affected by the primary portion of the sealing element over a large range of temperatures, or during a thermal shock test. Furthermore, it was surprising found that components of the spatial light modulator were better matched in thermal behaviour of the sealing element.

While the first material has been found to be particularly suitable for the primary portion of the sealing element, notably, the inventors found a different approach was required for the electrical connection region. The electrical connection region may comprise one or more first contact portions for connecting to one or more respective second contact portions of, for example, a connector or cable such as a flat flex connector or flexible printed cable or flexible printed circuit board. The one or more first contact portions may be delicate. The one or more second contact portions may be delicate. Any electrical connections (such as wire bonds) between the first contact portions and the second contact portions may be delicate. The inventors observed that, if the electrical contact region were covered in the first material (having a relatively high coefficient of thermal expansion), there is an elevated risk that the delicate electrical contact region (and any associated electrical connections and contact portions) are pulled and/or damaged as a result of expansion of the first material during any temperature changes. The inventors hypothesis that this is because of a significant coefficient of thermal expansion mismatch between the first material and the conductive materials of the electrical connection region. This problem particularly manifested itself during automotive-standard thermal shock tests. According to the present disclosure, a secondary portion of sealing element, comprising a second material having a relatively low coefficient thermal expansion, is provided. The inventors found that it was possible to adjoin the first material and second material, and that the additional complexities associated with forming this hybrid structure were worthwhile. In particular, it was found during large-scale testing that the occurrence of damage to the electrical contact region was significantly reduced without allowing the ingress of moisture. This finding was surprising.

In summary, by combining a primary portion of the sealing element extending around at least a portion of the perimeter of the light modulating region and comprising a first material having relatively higher coefficient of thermal expansion with a secondary portion of the sealing element covering the electrical connection region and comprising a second material having a relatively lower coefficient of thermal expansion, the spatial light modulator may be encapsulated and so protected from the environment, in particular from the ingress of moisture. The performance of the spatial light modulator over a range of operating temperatures is minimally affected by the sealing element while the electrical contact region and associated components are protected by, and not damaged by, the secondary portion.

The primary portion may consist of the first material. The secondary portion may consist of the second material.

The portion of the perimeter of the light modulating region that the primary portion of the sealing element extends around may be a portion of the perimeter that is not adjacent to the electrical connection region. The perimeter of the light modulating region may consist of a first portion and a second portion. The sealing element may extend around the first portion of the perimeter of the light modulating region. The second portion of the perimeter of the light modulating region may be adjacent to the electrical connection region. The first portion of the perimeter may comprise at least 50% of the perimeter of the light modulating region, optionally at least 60%, optionally at least 65%.

The first coefficient of thermal expansion may be at least double the second coefficient of thermal expansion. Optionally, the first coefficient of thermal expansion may be at least three times the second coefficient of thermal expansion, optionally at least four times the second coefficient of thermal expansion, optionally at least five times the second coefficient of the thermal expansion, optionally at least 10 times the second coefficient of the thermal expansion.

The first material may comprise or consist of a polymer material. The second material may comprise or consist of a polymer material. The first material and/or the second material may comprise or consist of an amorphous polymer material. The first and/or second material may comprise or consist of at least one of a resin such as a thermosetting resin or silicone. When the first and/or second material comprise a resin, the resin may be an epoxy resin. The first and/or second material may comprise a potting compound.

The person skilled in materials science understands what constitutes a high coefficient of thermal expansion and a low coefficient of thermal expansion in the context of the present disclosure. The first coefficient of thermal expansion may be at least 20 parts per million (ppm) per Kelvin, optionally at least 50 parts per million per Kelvin, optionally at least 80 parts per million per Kelvin. Optionally, the first coefficient of thermal expansion may be at least 90 ppm per Kelvin, optionally at least 100 ppm per Kelvin, optionally at least 110 ppm per Kelvin, optionally at least 125 ppm per Kelvin, optionally at least 150 ppm per Kelvin.

The second coefficient of thermal expansion may be less than 50 ppm per Kelvin. Optionally, the second coefficient of thermal expansion may be less than 40 ppm per Kelvin, optionally less than 30 ppm per Kelvin, optionally less than 25 ppm per Kelvin, optionally less than 20 ppm per Kelvin, optionally less than 15 ppm per Kelvin, optionally less than 10 ppm per Kelvin.

The first material may have a first glass transition temperature. The second material may have a second glass transition temperature. In other words, the first material and/or the second material may be material(s) which undergo a glass-liquid transition. The first material and the second material may comprise or consist of one or more amorphous materials. Optionally, the first material and the second material may comprise or consist of an amorphous polymer.

As will be understood by the skilled person, a glass-liquid transition (or glass transition) is the reversible transition of a material (usually an amorphous material) from a hard and relatively brittle state into a viscous or rubbery state as temperature is increased. The glass transition temperature is the temperature at which this transition occurs. It is sometimes said that the glass transition occurs over a range of temperatures, rather than a single temperature. However, as the skilled person will understand, a single "glass transition temperature" is usually associated with a material. In some examples disclosed herein, the quoted glass transition temperature has been determined by the ASTM E1356-08 test.

The first glass transition temperature (of the first material) may be less than the second glass transition temperature (of the second material). As the skilled person will be aware, materials according to the disclosure that have a relatively low coefficient of thermal expansion of will have a relatively high glass-liquid transition temperature, and vice versa.

It is believed that the secondary portion of the sealing element having a relatively higher glass transition ensures that the delicate electrical contact portion (covered by the secondary portion) experience less stress at relatively higher temperatures. In particular, the second glass transition temperature may advantageously be greater than the maximum expected operating temperature of the display device and/or the maximum temperature during a thermal shock test used by the automotive industry to test components to be placed within the cabin of a vehicle, in particular on the dashboard. In this way, the second material may not reach the glass transition temperature and so may not change state during operation. In particular, the second material may have a second glass transition temperature greater than 100 degrees Celsius, optionally greater than 110 degrees Celsius, optionally greater than 120 degrees Celsius.

It is believed that the primary portion of the sealing element having a relatively lower glass transition ensures that the secondary portion reaches the glass transition during a thermal shock test used by the automotive industry. Above the glass transition, the primary portion may be softer and more flexible. This may ensure that the stress and strain applied to the spatial light modulator by the primary portion is minimised at the higher temperatures of the automotive industry. The first material may have a first glass transition temperature less than 100 degrees Celsius. Optionally, the first material may have a first glass transition temperature less than 90 degrees Celsius, optionally less than 80 degrees Celsius, optionally less than 70 degrees Celsius, optionally less than 60 degrees Celsius, optionally less than 50 degrees Celsius.

The second glass transition temperature of the second material may be at least 10 degrees Celsius greater than the first glass transition temperature of the first material, optionally at least 15 degrees Celsius greater than the first glass transition temperature, optionally at least 20 degrees Celsius greater than the first glass transition temperature, optionally at least 30 degrees Celsius greater than the first glass transition temperature.

The sealing element may fully surround the spatial light modulator. This may ensure that the sealing element encapsulates the spatial light modulator and may protect the spatial light modulator from the ingress of moisture.

The primary portion of the sealing element may fully or at least partially surround the spatial light modulator. The primary portion of the sealing element may form a continuous boundary. The spatial light modulator may be fully contained within the continuous boundary. The continuous boundary may delineate an area on the surface of the substrate when the display device is viewed from above. The area may be surrounded by the continuous boundary such that the area of interest is inside, rather than outside, the continuous boundary. As used herein, a feature (such as the spatial light modulator, the second portion of the sealing element or electrical connection region) being described as "within" the continuous boundary formed by the first portion of the sealing element means that the feature is inside the area delineated by the continuous boundary. In other words, a feature within the continuous boundary may be described as being surrounded by the continuous boundary. This may be the case when the display device is viewed from above.

When the spatial light modulator is fully contained within the continuous boundary formed by the primary portion of the sealing element, the primary portion of the sealing element may be in contact with the spatial light modulator around substantially the full extent of the perimeter of the spatial light modulator. As described above, the perimeter of the light modulating region of the spatial light modulator may have a first portion and a second portion, and the primary portion of the sealing element may extend around the first portion of the light modulating region but may not extend around the second portion of the light modulating region which is adjacent to the electrical connection region. However, in such cases, the primary portion of the sealing element may extend around the electrical connection region instead of extending around the second portion of the perimeter of the light modulating region. In this way, the spatial light modulator as a whole may still be considered to be fully contained within the continuous boundary formed by the primary portion of the sealing element. As used herein, the sealing element extending around, for example, a portion of the perimeter of the light modulating region, may mean that the sealing element is in contact with the portion of the light modulating region that it extends around. The electrical connection region may be contained within the continuous boundary formed by the first portion of the sealing element.

In a notable further improvements, the secondary portion of the sealing element may be contained within the continuous boundary formed by the primary portion of the sealing element. In this way, the continuous boundary of the primary portion of the sealing element may advantageously define an outer boundary of the sealing element which surrounds the spatial light modulator as a whole and the secondary portion of the sealing element may be contained with within that boundary. This is particularly advantageous during manufacture of the sealing element. The first material of the primary portion of the sealing element may be applied to the display device first. The first material may then be cured or set to form the continuous boundary. The continuous boundary may surround at least the electrical contact region. The second material of the secondary portion of sealing material may then be applied to the display device. In particular, the second material may be applied on to the electrical contact region of the spatial light modulator (surrounded by the primary portion of the sealing element). The primary portion of sealing element may act as a dam for the second material during manufacture (which may be applied to the display device in a substantially liquid form). The primary portion of the sealing element may maintain the second material on the electrical contact region while the second material is cured or set. In this way, the primary portion of the sealing element may ensure that the cured or set secondary portion of the sealing element does indeed cover the electrical contact region of the spatial light modulator in order to fully encapsulate the delicate electrical contact region. The continuous boundary may extend around the electrical connection region in a substantially closed loop. The substantially closed loop may be a % closed loop and may have a U-shape. The substantially closed loop of the continuous boundary may define the dam for the secondary portion of the sealing element during the manufacture process. The dam may further be defined by the second portion of the perimeter of the display device (which may be adjacent the electrical contact region), as described above. Thus, the secondary portion of the sealing element may fill/cover the region defined by the U-shaped part of the continuous boundary and the second portion of the perimeter of the display device.

A top surface of the light modulating region may define a first plane. The substrate on which the spatial light modulator is mounted may define a second plane that is parallel to the first plane. The light modulating region may extend in a first dimension and a second dimension that is orthogonal to the first dimension. The first and second dimension may lie in the first plane. The light modulating region may have a width extending in the first dimension and a depth extending in the second dimension. The light modulating region may further have a thickness extending in a third dimension that is orthogonal to the first and second dimension. The thickness may be relatively much smaller than the width and the thickness such that the light modulating region may be described as planar. At least the primary portion of the sealing element may have a thickness that at least substantially corresponds to the thickness of the light modulating region such that the primary portion of the sealing element seals the sides of the light modulating region along the full thickness of the sides. The primary portion of the sealing element may have a thickness that is slightly larger than the light modulating region.

The light modulating region of the spatial light modulator may have a quadrilateral shape. The light modulating region of the spatial light modulator may have a quadrilateral shape in the first plane. In other words, the light modulating region may comprise four sides. In particular, the light modulating region may be square or, preferably, rectangular. The first portion of the sealing element may extend around first to third sides of the light modulating region (and may be arranged to provide a seal between the light modulating region and the substrate around the first to third sides). The electrical connection region may be adjacent to a fourth side of the light modulating region. The second portion of the sealing element may extend along the fourth side of the light modulating region (and may be arranged to provide a seal along the fourth side).

The electrical connection region may comprise or be connected to one or more wire bond connections. As will be known to the skilled person, wire bonding is a method of making electrical interconnections between a semiconductor device and its packaging or some other electrical component. Wire bond connections made during wire bonding are typically delicate and typically have a thickness of between 1 and 500 micrometers, optionally between 1 and 100 micrometers.

The one or more wire bond connections of the display device may be covered by (or encapsulated by) the secondary portion of the sealing element. As described above, the secondary portion of the sealing element protects the wire bond connections and prevent the ingress of moisture into the wire bond connections. Furthermore, the material of the secondary sealing element reduces the risk of damage to the wire bond connections during temperature changes, in particular during a thermal shock test.

The electrical connection region may comprise one or more first contact portions. The electrical connection region may optionally comprise more than ten, optionally more than twenty, optionally more than thirty or, optionally, more than forty first contact portions. The display device may comprise one or more second contact portions. Each of the first contact portions may be connected to a respective second contact portion with a wire bond connection. In other words, if, for example, the electrical connection region comprises twenty first contact portions, the display device may comprise twenty second contact portions and twenty wire bond connections.

The display device may comprise a connector for connecting the spatial light modulator to a controller configured to control the spatial light modulator. For example, the controller may be a real-time engine arranged to receive image data, calculate holograms in real-time and display the holograms on the spatial light modulator. The connector may comprise the second contact portions. The wire bonds may electrically connect the connector to the spatial light modulator via the first and second contact portions. The connector may comprise a flat flex connector or flexible printed cable or flexible printed circuit board.

The spatial light modulator may be a liquid crystal on silicon spatial light modulator (or "LCOS SLM"). The LCOS SLM may comprise electrically-addressable liquid crystals, optically-addressable liquid crystals or micro-mirrors, for example, to achieve light modulation.

The substrate may act as a carrier for the spatial light modulator. The substrate may comprise a ceramic material. The display device may comprise adhesive between the substrate and the spatial light modulator. The adhesive may act to secure the spatial light modulator to the substrate.

There is also provided a head-up display (HUD) system, which comprises the display device of the first aspect. The HUD system may be implemented in a vehicle, including but not limited to an automotive vehicle. The HUD system may further comprise an optical combiner such as a windscreen, or windshield. In some aspects, the display device may be configured to direct output light towards the optical combiner and the optical combiner may be arranged to direct (or, redirect) the output light towards an eye-box of the intended viewer.

In a second aspect there is provided a method of encapsulating a spatial light modulator. The spatial light modulator may be a feature of a display device. The display device may be a display device as described in relation to the first aspect. The method comprises the step of providing a substrate comprising a spatial light modulator mounted thereon. The spatial light modulator comprises a light modulating region and an electrical connection region adjacent to the light modulating region. The method further comprises forming a primary portion of a sealing element that extends around at least a portion of a perimeter of the light modulating region. The method further comprises forming a secondary portion of the sealing element that extends over the electrical connection region.

The primary portion comprises a first material and the secondary portion comprises a second material. The first material having a first coefficient of thermal expansion that is greater than a second coefficient of thermal expansion of the second material.

A display device comprising a spatial light modulator encapsulated according to the method of the second aspect has the advantages described in relation to the first aspect. Features described in relation to the first aspect may apply to the method of the second aspect. For example, the features of the first and second materials described in the first aspect may apply to the first and second materials in the second aspect. Similarly, the features of the primary portion and the secondary portion of the sealing element described in relation to the first aspect may apply to the primary portion and the secondary portion of the second aspect.

The step of forming the primary portion of the sealing element may comprise applying the first material and then setting or curing the first material; wherein the step of forming the secondary portion of the sealing element comprises applying the second material and then setting or curing the second material. The first and second material may be applied in liquid form.

Optionally, the step of forming the secondary portion of the sealing element may be performed after the step of forming the primary portion of the sealing element.

The step of forming the primary portion of the sealing element may comprise forming a continuous boundary that partially, preferably fully, contains the spatial light modulator. The step of forming the secondary portion of the sealing element may comprise filling an area containing the electrical contact region, and defined by the continuous boundary and the light modulating region, with second material. In this way, the primary portion of the sealing element may ensure that the cured or set secondary portion of the sealing element does indeed cover the electrical contact region of the spatial light modulator in order to fully encapsulate the delicate electrical contact region. The continuous boundary may extend around the electrical connection region in a U-shape. The U-shaped part of the continuous boundary may define the dam for the secondary portion of the sealing element during the manufacture process. The dam may further be defined by a portion of the perimeter of the display device. Thus, the secondary portion of the sealing element may fill/cover the region defined by the U-shaped part of the continuous boundary and the second portion of the perimeter of the display device.

The step of providing a substrate may comprise mounting the spatial light modulator on the substrate. Mounting the spatial light modulator may comprise applying an adhesive to the substrate and bringing the spatial light modulator into contact with the adhesive.

According to third aspect of the disclosure there is provided a display device. The display device comprises a substrate and a spatial light modulator. The spatial light modulator is mounted on the substrate. The spatial light modulator comprises a light modulating region and an electrical connection region adjacent to the light modulating region. The display device further comprises a sealing element. The sealing element comprises a primary portion comprising a first material and a secondary portion comprising a second material. The second material is different to the first material. The primary portion of the sealing element extends around at least a portion of a perimeter of the light modulating region. The secondary portion of the sealing element extends over the electrical connection region. The first material (of the primary portion) has a first glass transition temperature that is less than a second glass transition temperature of the second material (of the secondary portion).

According to a fourth aspect of the disclosure there is provided a display device. The display device comprises a substrate. The display device further comprises a spatial light modulator mounted on the substrate and an electrical connection region. The display device further comprises a sealing element. The sealing element comprises a primary portion comprising a first material. The sealing element further comprises a secondary portion comprising a second material. The second material is different to the first material. The primary portion of the sealing element extends around at least a portion of a perimeter of the spatial light modulator. The secondary portion of the sealing element extends over the electrical connection region. The first material (of the primary portion) has a first coefficient of thermal expansion that is greater than a second coefficient of thermal expansion of the second material (of the secondary portion).

The spatial light modulator may comprise a light modulating region or a pixel region. The primary portion of the sealing element may extend around a perimeter of the light modulating region. The spatial light modulator may further comprise the electrical connection region.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level"

may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
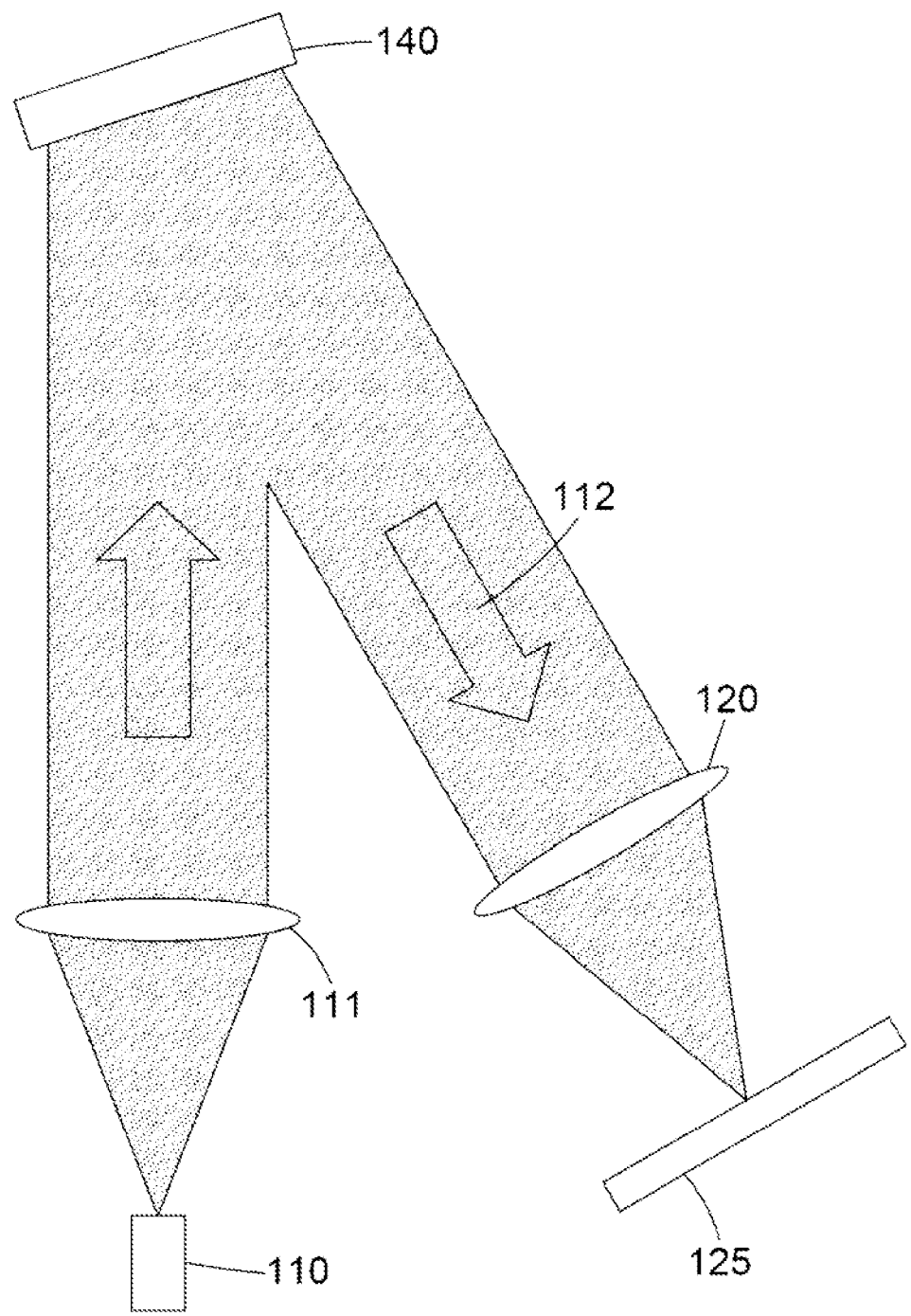
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
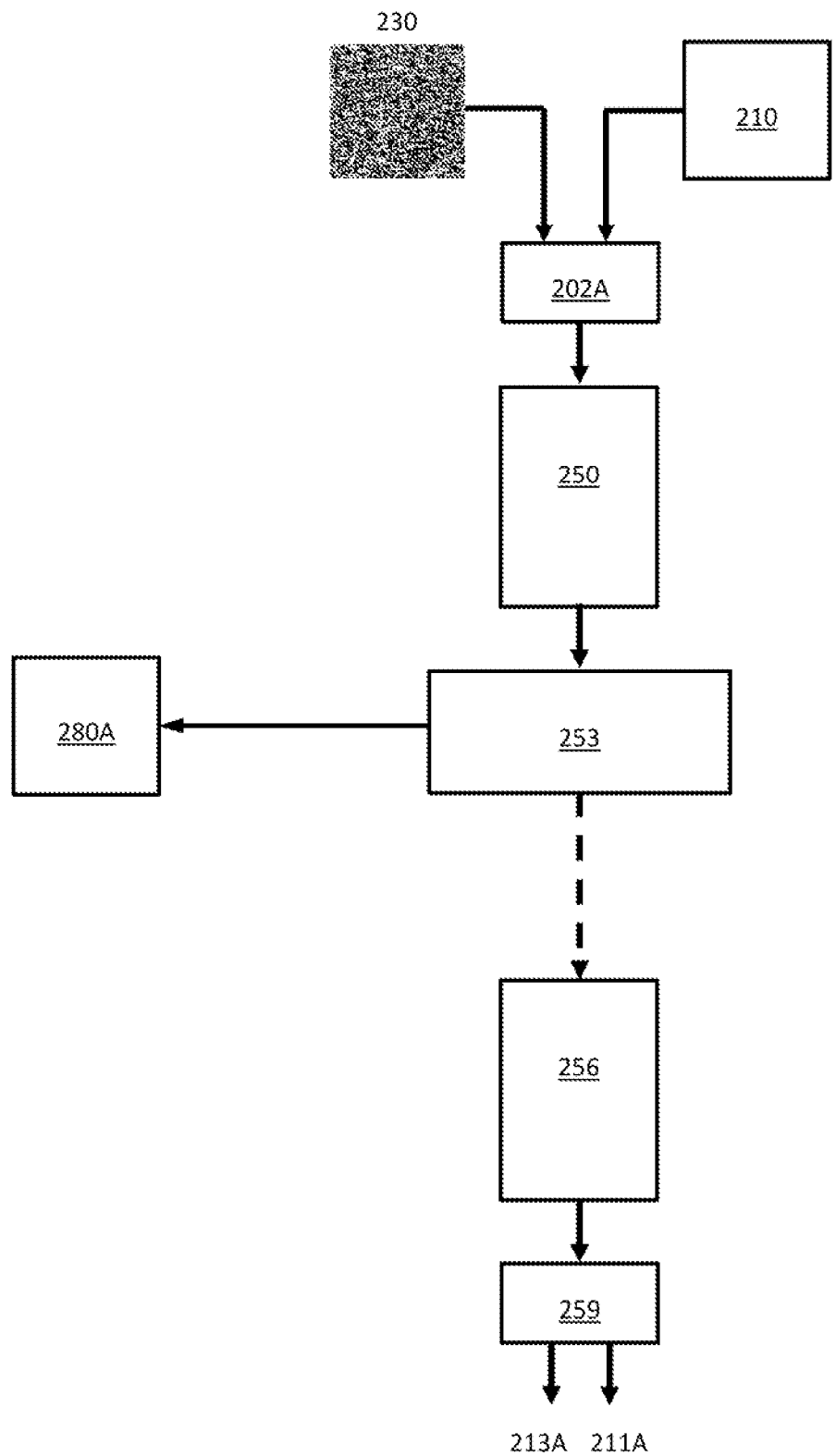
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
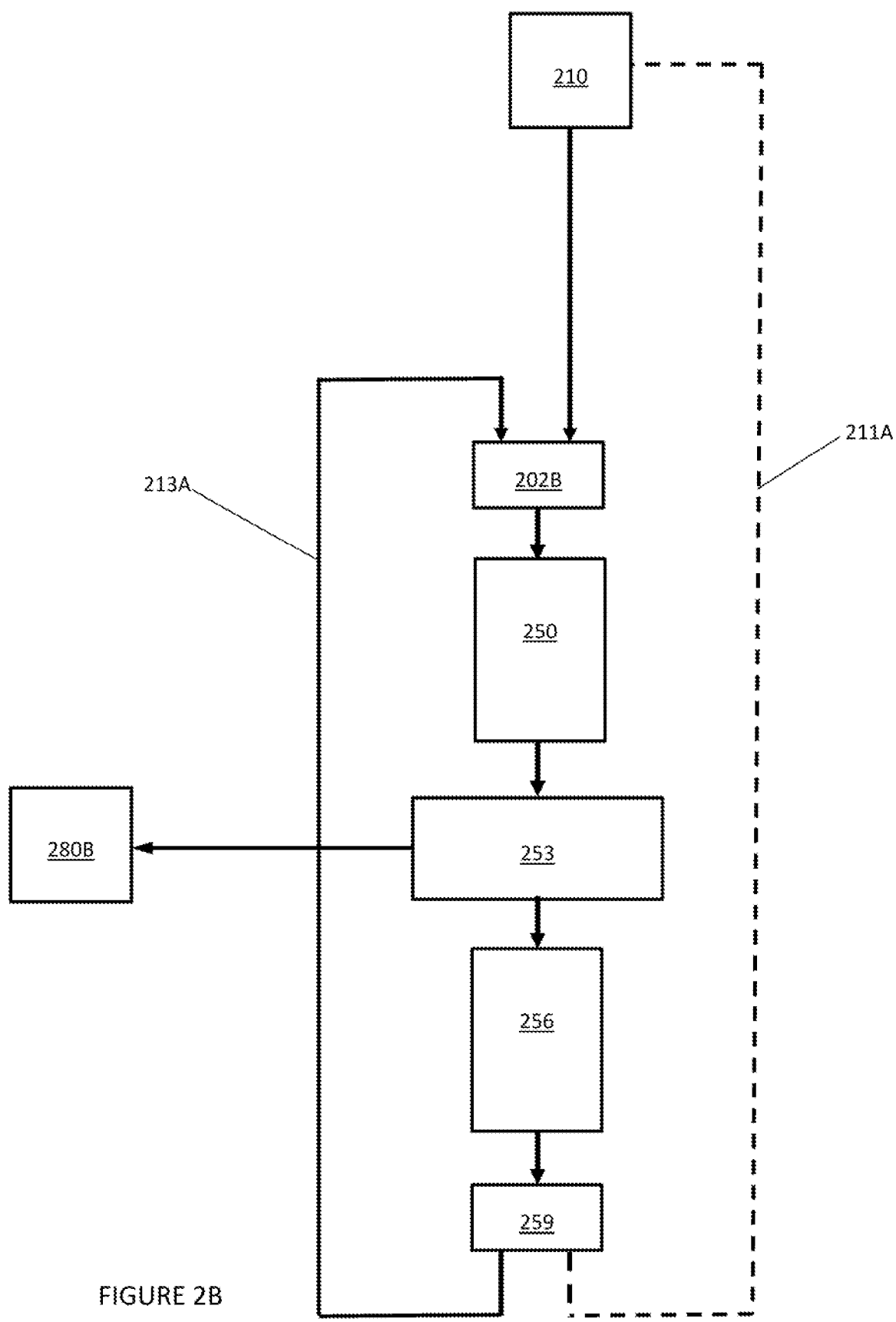
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
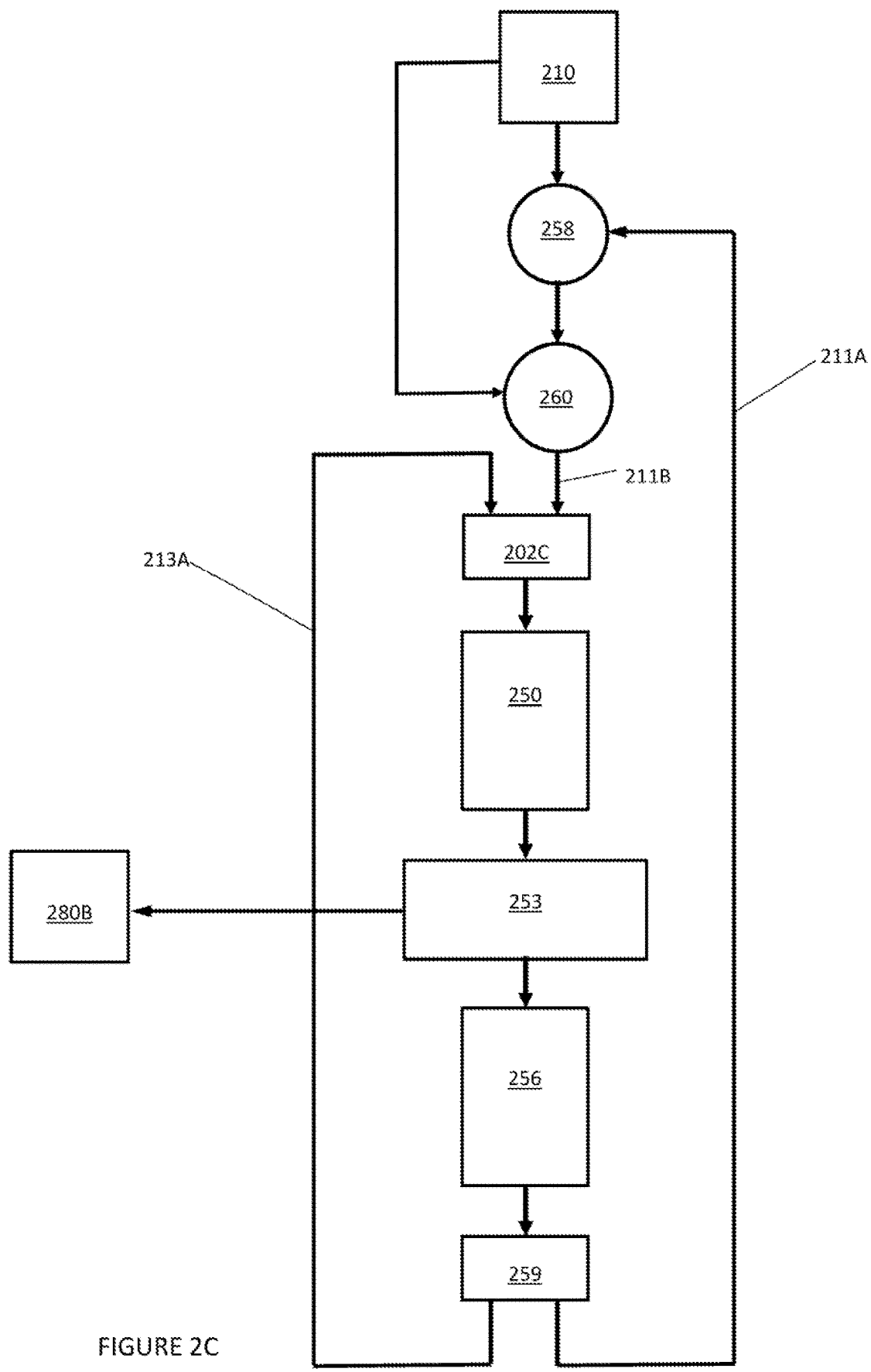
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Display Device

Figure 3:
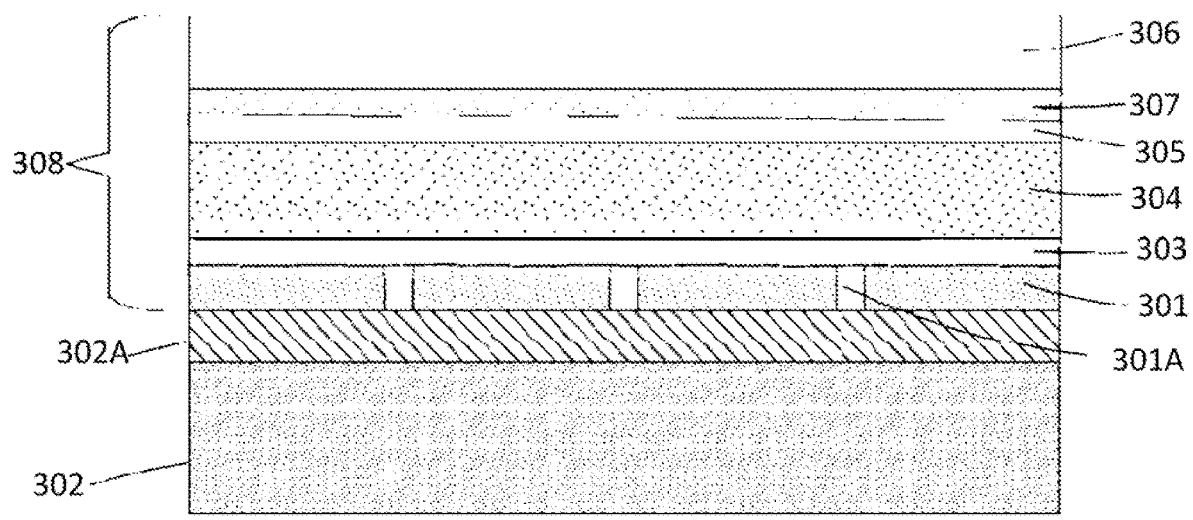
FIG. 3 is a schematic of a reflective LCOS SLM.
Figure 4:
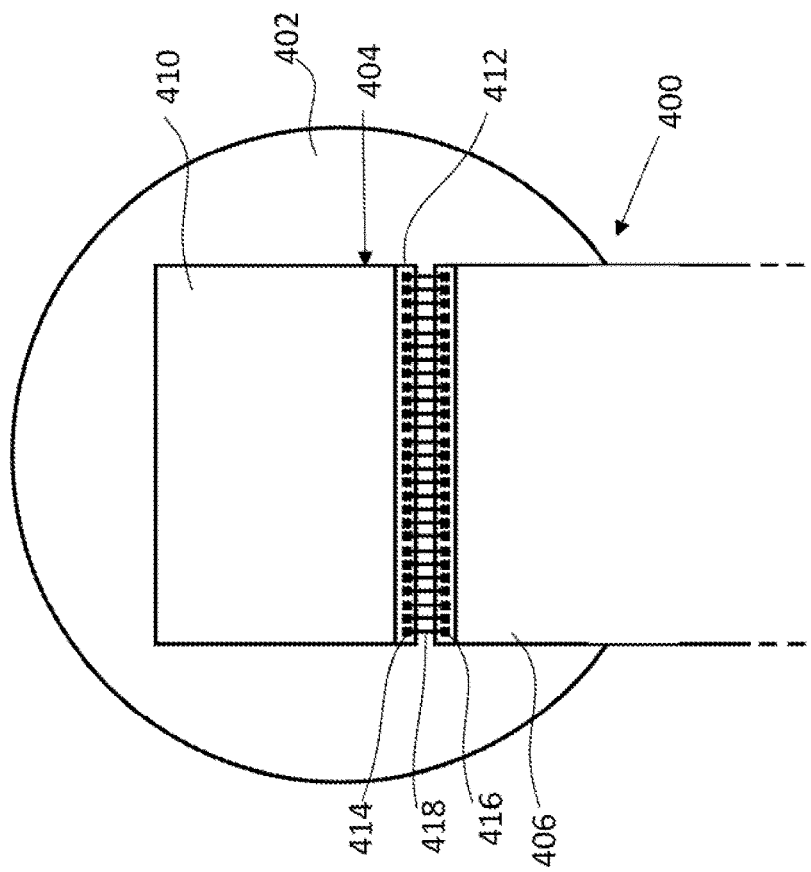
FIG. 4 is a top view of a schematic of a spatial light modulator.

A spatial light modulator, such as the spatial light modulator described in relation to FIG. 3, can be packaged as a display device which, in some embodiments, can be provided as part of a HUD system for use in a vehicle. The display device may be a component that is manufactured separately as a standalone component and then fitted into an appropriate the HUD system when the HUD system is assembled. FIG. 4 shows a schematic top view of such a display device 400.

The display device 400 comprises a substrate 402 in the form of ceramic carrier and a spatial light modulator 404 mounted on the substrate 402. In this example, the spatial light modulator 404 is an SLM LCOS as described in relation to FIG. 3. However, it will be clear to the skilled person that other spatial light modulators may take the place of the LCOS SLM of FIG. 3 in the display device. The substrate 402 (of the display device) shown in FIG. 4 is different to the substrate 302 (of the LCOS SLM) shown in FIG. 3. An adhesive layer (not shown in the figures) secures the spatial light modulator 404 to the substrate 402. In particular, the adhesive layer secures the substrate 302 of the spatial light modulator 404 to the substrate 402 of the display device. The substrate 402 comprises a heat dissipation portion which is directly below the spatial light modulator 404 and so cannot be seen in FIG. 4. The heat dissipating portion of the substrate 402 is a portion comprising a metal such as aluminium which is arranged to conduct heat away from the spatial light modulator.

A connector 406 is connected to the spatial light modulator 404 which, in this example, is a flexible printed cable capable but may alternatively be a flat flex connector or a flexible printed circuit board. Only an end portion of the connector 406 is shown in FIG. 4. The connector 406 extends from the end portion and away from the spatial light modulator 404. This is represented by the broken lines in FIG. 4. In some embodiments, the other end of the connector 406 (not shown in figures) is connected to another part of a HUD system. In some examples, the connector 406 is directly or indirectly electrically connected to a controller of the HUD system such as a real-time engine arranged to receive image data, calculate holograms in real-time and display the holograms on the spatial light modulator via the connector 406.

The spatial light modulator 404 comprises a light modulating region 410 and an electrical connection region 412 (or wire bond region). From the perspective shown, the light modulating region 410 of FIG. 4 corresponds to the planar transparent glass layer 306 of FIG. 3. The electrical connection region 412 is used to connect the spatial light modulator 404 to the rest of the HUD system via the connector 406. The electrical connection region 412 comprises a plurality of (in this example, 28, but the present disclosure is not limited thereto) first contact portions 414. Each first contact portion 414 is electrically connected to circuitry 302a described in FIG. 3.

The spatial light modulator 404 comprises a plurality of second contact portions 416. There is one second contact portion 416 for each first contact portion 414 so, in this example, there are 28 second contact portions 416. Each first contact portion 414 is connected to a respective second contact portion 416 via a wire bond 418 such that there are also 28 wire bonds in this example. In one embodiment, the wire bonds 418 are formed of aluminium doped with silicon and have a thickness of 32 micrometres. The wire bonds 418 are formed by wedge bonding. However, the present disclosure is not limited to a particular type of wire bonding or wire bonds having a particular size or formed of a particular material.

In one example, during use of the display device 400, a computer-generated hologram is generated by the controller. The spatial light modulator 400 receives the computer-generated hologram via the connector 406, the second contact portions 416, the wire bonds 418 and then the first contact portion 414 before being received by circuitry 302a (as described in relation to FIG. 3). The array of pixels of the spatial light modulator 400 is then encoded with the hologram generated by the controller. As described above, the array of pixels of the spatial light modulator 400 is then illuminated with light from a light source such as a laser or laser diode such that light is incident on the spatial light modulator. The light is then modulated in accordance with the hologram.

The spatial light modulator 400 is a very sensitive electrical component. Furthermore, the wire bonds 418 and the first and second contact portions 414,416 are delicate. These features may be adversely effected when exposed to the atmosphere. A particular problem is the ingress of the moisture into the spatial light modulator or electrical connections. This can adversely affect the quality of the holograms displayed on the spatial light modulator 400 and so adversely affect the final image viewed by a user when the spatial light modulator 400 is part of a head-up display.

Encapsulated Spatial Light Modulator

Figure 5:
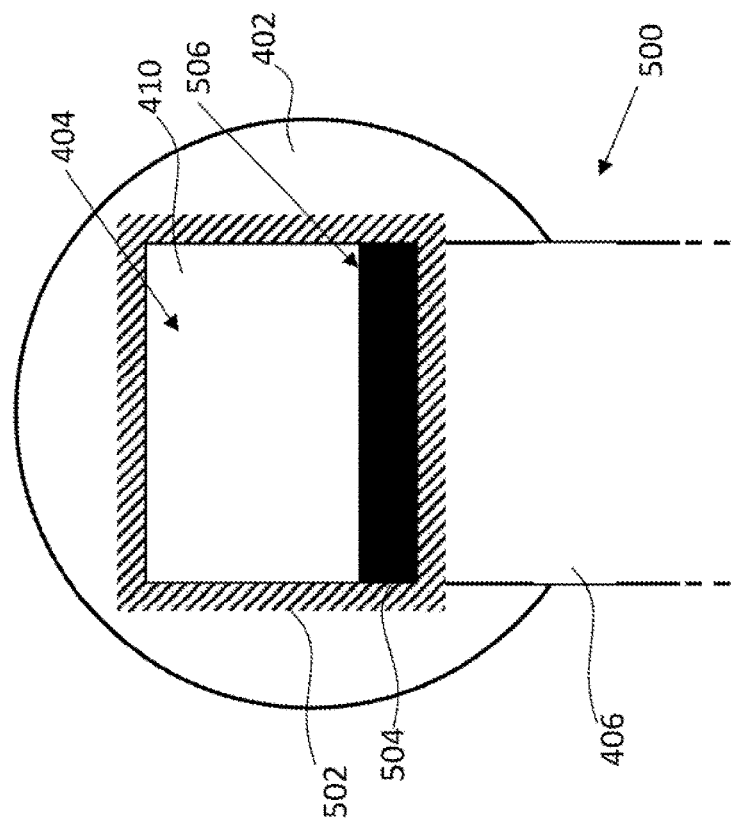
FIG. 5 is a top view of a schematic of an encapsulated spatial light modulator according to the disclosure.

FIG. 5 shows an embodiment of a display device 500 according to this disclosure. FIG. 5 shows a schematic top view of such a display device 500. The display device 500 of FIG. 5 is similar to the display device 400 of FIG. 4 and like features are numbered accordingly. In particular, the display device 500 comprises a substrate 402, a spatial light modulator 404 mounted on the substrate 402 and a connector 406 electrically connected to the spatial light modulator 404. The main difference between the display device 400 and the display device 500 is that the spatial light modulator of FIG. 5 has been encapsulated by a sealing element.

The sealing element provides a seal around the spatial light modulator to protect the spatial light modulator from the atmosphere, in particular to prevent the ingress of moisture from outside of the spatial light modulator 404 into the spatial light modulator 404. The sealing element comprises a primary portion 502 and a secondary portion 504.

The primary portion 502 extends around three sides of a perimeter of the light modulating region 410. The primary portion 502 is in contact with the substrate 402 and the light modulating region 410 around said three sides. The primary portion 502 of the sealing element is not in contact in with the fourth side 506 of the light modulating region 410. Instead, the primary portion 502 extends beyond the light modulating region 410 to form a U-shape around the electrical connection region 412. The primary portion 502 of the sealing element forms a continuous boundary. The spatial light modulator (including both the light modulating region 410 and the electrical connection region 412) is fully contained within the continuous boundary.

The secondary portion 504 of the sealing element extends over the electrical connection region 412. In particular, the secondary portion 504 of the sealing element fills an area defined by the U-shaped portion of the primary portion 502 and the fourth side 506 of the light modulating region 410. In this way, the secondary portion 504 encapsulates the electrical connections region 412 as well as the wire bonds 418 and the first and second contact portions 414,416.

Together, the primary and secondary portions 502,504 of the sealing element encapsulate the spatial light modulator 400. As described above, the exposed top surface of the light modulating region comprises a glass layer 306. The bottom surface of the spatial light modulator 404 is in contact with the substrate 402. Any other surfaces of the spatial light modulator are encapsulated by the sealing element and so are not exposed to the atmosphere. Thus, the sealing element effectively prevent ingress of moisture into the spatial light modulator 404 and, more generally, protects the spatial light modulator from the atmosphere.

The primary portion 502 consists of a first material. The secondary portion 504 consists of a second material that is different to the first material. In this example, the first and second material are both amorphous polymers. The first material has a first coefficient of thermal expansion that is at least 80 parts per million per Kelvin. The second material has a second coefficient of thermal expansion that is less than 50 parts per million per Kelvin.

The first material, having a relatively higher coefficient of thermal expansion, is particularly suitable for extending around the three sides of the light modulating region because such a first material is typically relatively soft and/or flexible and/or deformable. Thus, the primary portion 502 of the sealing element causes minimal mechanical stress or strain to be applied to the spatial light modulator over a range of temperatures. The first material is less suitable for covering the electrical connection region 412. If the electrical contact region 412 were covered in the first material (having a relatively high coefficient of thermal expansion) there is a risk that the delicate electrical contact region (and the first and second contact portions and wire bonds) would be pulled and/or damaged as a result of expansion of the first material during temperature changes. The secondary portion 504 of the sealing element comprises a second material having a relatively lower coefficient thermal expansion and so will expand less than the primary portion for a given change in temperature. Furthermore, the rigidity of the second material provides protection. Thus, the risk of damage to the electrical contact region is reduced.

In summary, the encapsulated spatial light modulator 504 according to the disclosure is protected from the environment, in particular from the ingress of moisture. The encapsulant materials forming the sealing element are chosen such that the performance of the spatial light modulator 504 over a range of operating temperatures is minimally affected by the sealing element while the electrical contact region and associated components are protected by, and not damaged by, the secondary portion 506. This is particularly significant during thermal shocks.

The first material has a first glass transition temperature. The second material has a second glass transition temperature. The second glass temperature of the second material is greater than 100 degrees Celsius. Advantageously, this is greater than the maximum expected operating temperature of the display device and/or the maximum temperature during a thermal shock test used by the automotive industry to test components to be placed within the cabin of a vehicle, in particular on the dashboard. In this way, the second material may not reach the glass transition temperature and so may not change from the glass state during operation. The first glass transition temperature is less than 100 degrees Celsius.

Accordingly, there is provided a display device comprising a substrate, a spatial light modulator mounted on the substrate and a connector. The spatial light modulator comprises a light modulating region and an electrical connection region adjacent to the light modulating region. The electrical connection region comprises first contact portions. The connector is electrically connected to the spatial light modulator and comprises second contact portions electrically connected to respective first contact portions of the electrical connection region of the spatial light modulator. The display device comprises a sealing element encapsulating the spatial light modulator on the substrate. The sealing element comprises a primary portion comprising a first material and a secondary portion comprising a second material. The primary portion of the sealing element extends around at least a portion of a perimeter of the light modulating region. The secondary portion of the sealing element extends over the electrical connection region comprising the first contact portions and the second contact portions of the connector. The first material has a first coefficient of thermal expansion that is greater than a second coefficient of thermal expansion of the second material.

Method of Encapsulation

Figure 6:
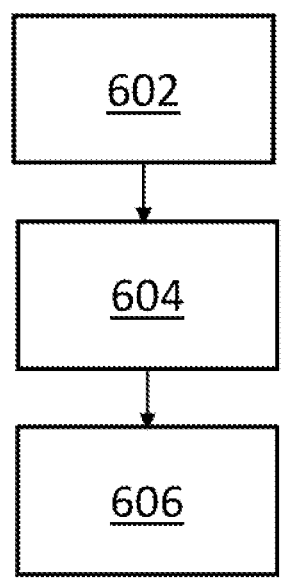
FIG. 6 illustrates a method of encapsulating a spatial light modulator according to the disclosure.

FIG. 6 is a block diagram of a method of encapsulating a spatial light modulator of a display device.

Step 602 of the method comprises providing a substrate comprising a spatial light modulator mounted on the substrate, the spatial light modulator comprising a light modulating region and an electrical connection region adjacent to the light modulating region. In some examples, the substrate and spatial light modulator are the substrate 402 and spatial light modulator 404 shown in FIG. 4. In some examples, step 602 of the method comprises providing a display device as shown in FIG. 4. For example, the display device may additionally comprise a connector 406.

Step 604 of the method comprises forming a primary portion 502 of a sealing element that extends around at least a portion of a perimeter of the light modulating region 410. The primary portion 502 is formed by applying the first material to the display device in liquid form. Step 604 of the method further comprises setting or curing the first material. The first material, in liquid form, is highly viscous and so is retained in placed during the setting or curing step.

Figure 7:
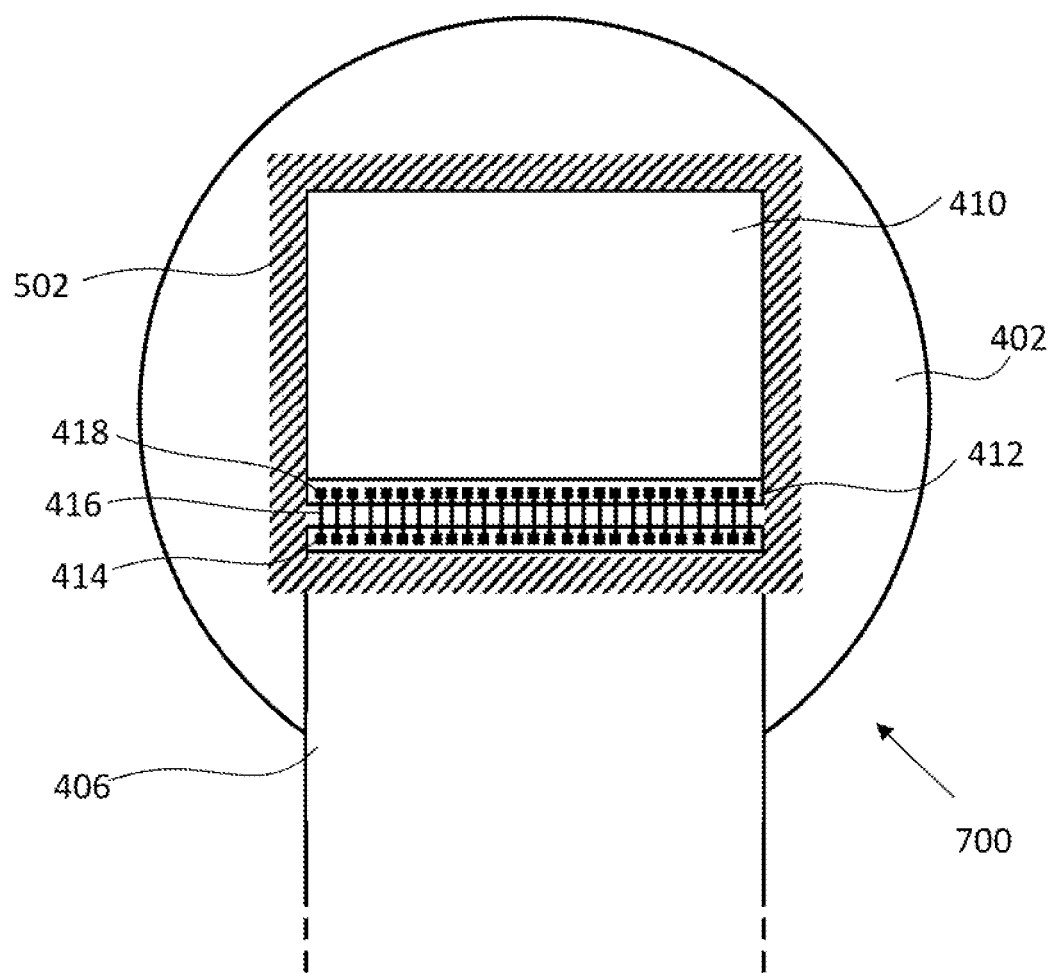
FIG. 7 illustrates a top view of a schematic of intermediate of a partially encapsulated spatial light modulator part-way through the method of FIG. 6.

FIG. 7 shows a schematic top view of a display device 700 immediately following step 604. In particular, FIG. 7 shows the primary portion 502 forming a continuous boundary that fully contains or encloses the spatial light modulator 404, that extends around three sides of the light modulating region 410 and that forms a U-shape around the electrical connection region 412. In step 604, the secondary portion 504 has not yet been formed, and so the electrical connection 412 is not shown as covered/encapsulated in FIG. 7.

Step 606 of the method further comprises forming a secondary portion of the sealing element that extends over the electrical connection region. The secondary portion 504 is formed by applying the second material to the display device in liquid form. Step 606 of the method further comprises setting or curing the first material.

While step 604 and 606 could be performed in either order, it is preferable to perform step 606 after step 604. When step 606 is performed after step 604, forming the secondary portion 504 of the sealing element comprises filling an area containing the electrical contact region and defined by the continuous boundary of the primary portion 502 and the light modulating region 410 with second material. The U-shaped part of the continuous boundary defines a dam for the secondary portion 504 of the sealing element during the manufacture process. The second material (which is less viscous than the first material) is contained by the dam during the curing/setting process. Thus, the secondary portion of the sealing element fills/covers the region defined by the U-shaped part of the continuous boundary and the second portion of the perimeter of the display device.

Accordingly, there is provided a method of encapsulating a spatial light modulator on a substrate to form a display device. The method comprises providing a substrate comprising a spatial light modulator mounted on the substrate. The spatial light modulator comprises a light modulating region and an electrical connection region adjacent to the light modulating region, wherein the electrical connection region comprises first contact portions. The method further comprises providing a connector electrically connected to the spatial light modulator. The connector comprises second contact portions electrically connected to respective first contact portions of the electrical connection region of the spatial light modulator. The method comprises encapsulating the spatial light modulator on the substrate by forming a sealing element. The encapsulating step comprises forming a primary portion of the sealing element extending around at least a portion of a perimeter of the light modulating region. The encapsulating step further comprises forming a secondary portion of the sealing element extending over the electrical connection region comprising the first contact portions and the second contact portions of the connector. The primary portion comprises a first material and the secondary portion comprises a second material. The first material having a first coefficient of thermal expansion that is greater than a second coefficient of thermal expansion of the second material.

As the skilled person will appreciate, the method may be used to encapsulate a spatial light modulator on a carrier substrate, such as a ceramic substrate, to form an assembled display device as a standalone component for integration within a larger system or product, such as a head-up display or a LiDAR system, as described herein.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A display device comprising:
   a substrate;
   a spatial light modulator mounted on the substrate and comprising a light modulating region and an electrical connection region adjacent to the light modulating region;
   a sealing element comprising a primary portion comprising a first material and a secondary portion comprising a second material;
   wherein the primary portion of the sealing element extends around at least a portion of a perimeter of the light modulating region and the secondary portion of the sealing element extends over the electrical connection region; and
   wherein the first material has a first coefficient of thermal expansion that is greater than a second coefficient of thermal expansion of the second material.

2. The display device of claim 1, wherein the first coefficient of thermal expansion is at least double the second coefficient of thermal expansion.

3. The display device of claim 1, wherein the first coefficient of thermal expansion is one of (i) at least 20 parts per million per Kelvin, (ii) at least 50 parts per million, or (iii) at least 80 parts per million.

4. The display device of claim 1, wherein the second coefficient of thermal expansion is one of (I) less than 50 parts per million per Kelvin, (ii) less than 30 parts per million, or (iii) optionally less than 20 parts per million.

5. The display device of claim 1, wherein the first and second materials are selected from the group consisting of: amorphous polymers, and materials comprising at least one of a resin or silicone.

6. The display device of claim 1, wherein at least one of: (i) the first material has a first glass transition temperature that is less than a second glass transition temperature of the second material or (ii) the second material has a second glass transition temperature of more than 100 degrees Celsius.

7. The display device of claim 1, wherein the primary portion of the sealing element forms a continuous boundary and the spatial light modulator is fully contained within the continuous boundary.

8. The display device of claim 7, wherein:
   the secondary portion of the sealing element is contained within the continuous boundary formed by the primary portion of the sealing element; and
   the continuous boundary extends around the electrical connection region in a U-shape.

9. The display device of claim 1, wherein the light modulating region of the spatial light modulator has a quadrilateral shape and wherein the primary portion of the sealing element extends around first to third sides of the light modulating region.

10. The display device of claim 9, wherein:
    the electrical connection region is adjacent to a fourth side of the light modulating region; and
    the secondary portion of the sealing element extends along the fourth side of the light modulating region.

11. The display device of claim 1, wherein the perimeter of the light modulating region comprises a first portion and a second portion, wherein the primary portion of the sealing element extends around the first portion of the perimeter of the light modulating region, and wherein the secondary portion of the perimeter of the light modulating region is adjacent to the electrical connection region.

12. The display device of claim 1, wherein at least one of (i) the primary portion of the sealing element extends around at least 50% of the perimeter of the spatial light modulator or (ii) the primary portion of the sealing element extends around at least 60% of the perimeter of the spatial light modulator.

13. The display device of claim 1, wherein the electrical connection region comprises or is connected to one or more wire bond connections.

14. The display device of claim 13, wherein the one or more wire bond connections are covered by the secondary portion of the sealing element.

15. The display device of claim 13, further comprising a connector configured to connect the spatial light modulator to a controller, wherein the controller is configured to control the spatial light modulator, and wherein the one or more wire bond connections electrically connect the connector to the spatial light modulator.

16. The display device of claim 15, wherein the connector comprises at least one of (i) a flat flex connector, (ii) flexible printed cable, or (iii) a flexible printed circuit board.

17. The display device of claim 1, wherein the spatial light modulator is a liquid crystal on silicon spatial light modulator.

18. A display device comprising:
a substrate;
a spatial light modulator mounted on the substrate and comprising a light modulating region and an electrical connection region adjacent to the light modulating region, wherein the electrical connection region comprises first contact portions;
a connector electrically connected to the spatial light modulator, wherein the connector comprises second contact portions electrically connected to respective first contact portions of the electrical connection region of the spatial light modulator;
a sealing element encapsulating the spatial light modulator on the substrate, the sealing element comprising a primary portion comprising a first material and a secondary portion comprising a second material;
wherein the primary portion of the sealing element extends around at least a portion of a perimeter of the light modulating region and the secondary portion of the sealing element extends over the electrical connection region comprising the first contact portions and the second contact portions of the connector; and
wherein the first material has a first coefficient of thermal expansion that is greater than a second coefficient of thermal expansion of the second material.

19. The display device of claim 18, wherein the first contact portions of the electrical connection region are connected to one or more respective wire bond connections such that the one or more respective wire bond connections are covered by the secondary portion of the sealing element.

20. The display device of claim 19, wherein the connector is arranged to connect the spatial light modulator to a controller, wherein the controller is configured to control the spatial light modulator, and wherein the one or more respective wire bond connections electrically connect the connector to the spatial light modulator.

21. A head-up display for a vehicle comprising one of a first display device or a second display device, wherein:
the first display device comprises (i) a substrate, (ii) a spatial light modulator mounted on the substrate and comprising a light modulating region and an electrical connection region adjacent to the light modulating region, and (iii) a sealing element comprising a primary portion comprising a first material and a secondary portion comprising a second material, wherein the primary portion of the sealing element extends around at least a portion of a perimeter of the light modulating region and the secondary portion of the sealing element extends over the electrical connection region, and wherein the first material has a first coefficient of thermal expansion that is greater than a second coefficient of thermal expansion of the second material; and
the second display device comprises (i) a substrate, (iii) a spatial light modulator mounted on the substrate and comprising a light modulating region and an electrical connection region adjacent to the light modulating region, wherein the electrical connection region comprises first contact portions, (iii) a connector electrically connected to the spatial light modulator, wherein the connector comprises second contact portions electrically connected to respective first contact portions of the electrical connection region of the spatial light modulator, and (iv) a sealing element encapsulating the spatial light modulator on the substrate, the sealing element comprising a primary portion comprising a first material and a secondary portion comprising a second material, wherein the primary portion of the sealing element extends around at least a portion of a perimeter of the light modulating region and the secondary portion of the sealing element extends over the electrical connection region comprising the first contact portions and the second contact portions of the connector, and wherein the first material has a first coefficient of thermal expansion that is greater than a second coefficient of thermal expansion of the second material.

22. A method of encapsulating a spatial light modulator for a substrate comprising a spatial light modulator mounted on the substrate, wherein the spatial light modulator comprises a light modulating region and an electrical connection region adjacent to the light modulating region, the method comprising:
forming a primary portion of a sealing element that extends around at least a portion of a perimeter of the light modulating region; and
forming a secondary portion of the sealing element that extends over the electrical connection region;
wherein the primary portion comprises a first material and the secondary portion comprises a second material, the first material having a first coefficient of thermal expansion that is greater than a second coefficient of thermal expansion of the second material.

23. The method of claim 22, wherein forming the secondary portion of the sealing element is performed after forming the primary portion of the sealing element.

24. The method of claim 22, wherein forming the primary portion of the sealing element comprises forming a continuous boundary that fully or partially contains the spatial light modulator and wherein forming the secondary portion of the sealing element comprises filling an area containing the electrical connection region and defined by the continuous boundary and the light modulating region with second material.

25. A method of encapsulating a spatial light modulator on a substrate to form a display device, the method comprising:
providing a substrate comprising a spatial light modulator mounted on the substrate, the spatial light modulator comprising a light modulating region and an electrical connection region adjacent to the light modulating region, wherein the electrical connection region comprises first contact portions;
providing a connector electrically connected to the spatial light modulator, wherein the connector comprises second contact portions electrically connected to respective first contact portions of the electrical connection region of the spatial light modulator; and
encapsulating the spatial light modulator on the substrate by forming a sealing element, wherein encapsulating the spatial light modulator on the substrate by forming a sealing element comprises:
forming a primary portion of the sealing element extending around at least a portion of a perimeter of the light modulating region; and
forming a secondary portion of the sealing element extending over the electrical connection region comprising the first contact portions and the second contact portions of the connector;
wherein the primary portion comprises a first material and the secondary portion comprises a second material, the first material having a first coefficient of thermal expansion that is greater than a second coefficient of thermal expansion of the second material.

\* \* \* \* \*